(No Model.)
H. C. WHITE.
Cooking Vessel.
No. 233,054.                     Patented Oct. 5, 1880.
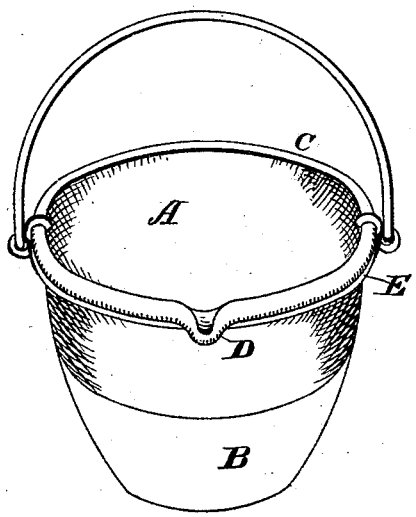
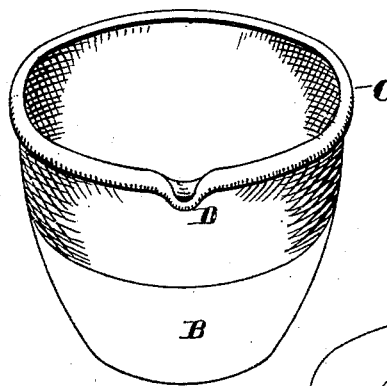
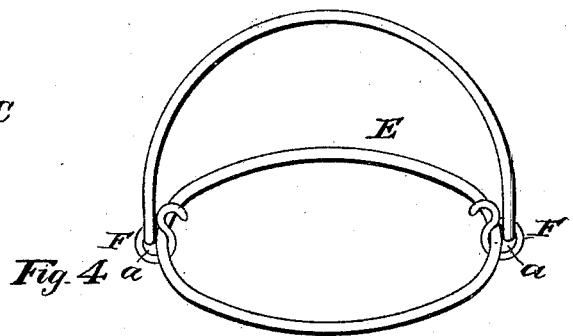
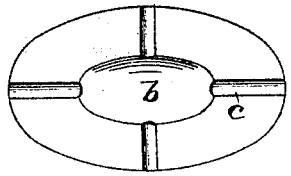
WITNESSES
A. L. Lawrence.
J. Walter Fowler
INVENTOR
Henry C. White
By H. A. Seymour
ATTORNEY

UNITED STATES PATENT OFFICE.

HENRY C. WHITE, OF MADISON, INDIANA.

COOKING-VESSEL.

SPECIFICATION forming part of Letters Patent No. 233,054, dated October 5, 1880.

Application filed July 26, 1880. (No model.)

*To all whom it may concern:*

Be it known that I, HENRY C. WHITE, of Madison, in the county of Jefferson and State of Indiana, have invented certain new and useful Improvements in Cooking-Vessels; and I do hereby declare the following to be a full, clear, and exact description of the invention, such as will enable others skilled in the art to which it pertains to make and use it, reference being had to the accompanying drawings, which form part of this specification.

My invention relates to an improvement in domestic culinary utensils, and is particularly designed to provide a vessel wherein fruit and sirups may be cooked without being discolored or tainted with the flavor of other substances previously cooked therein, being equally well adapted for all other cooking purposes, and of light weight, lasting in use, easily kept clean, and capable of being manufactured and supplied to the trade at a comparatively light cost.

With these objects in view, my invention consists, first, in the combination, with a vessel formed with an outwardly-projecting rim or flange, of a metallic band encircling said vessel and a hook attached to the band and constructed to clasp the rim and hold the band against vertical displacement.

My invention further consists in the combination, with a fire-clay cooking-vessel formed with an outwardly-projecting flange or rim, of a metallic band encircling said vessel and a hook attached to the band and constructed to clasp the rim and hold said band against vertical displacement.

My invention further consists in the combination, with a fire-clay cooking-vessel formed with an outwardly-projecting flange or rim, of a metallic band encircling said vessel and a hook attached to the band and constructed to clasp the rim and hold the band against displacement, and to form a bail-ear for the bail.

My invention further consists in certain details of construction and arrangement of parts, as will be hereinafter described and pointed out in the claims.

In the accompanying drawings, Figure 1 is a perspective view of my improved fire-clay cooking-vessel as complete for use. Fig. 2 is a perspective view of the same with the bail and encircling-band removed. Fig. 3 represents the encircling-band and bail attached removed from the vessel. Fig. 4 is a plan view of the bottom of the vessel, and Fig. 5 is a detail view of the bail-ear and hook device for retaining the band in place on the vessel and for the attachment of the bail.

A represents the vessel, formed of fire-clay and glazed interiorly and exteriorly, except a narrow band, B, extending around the lower portion thereof, said unglazed portion being subjected to the direct action of the fire when the vessel is set in the stove-hole. The top of the vessel is provided with an outwardly-projecting flange or rim, C, molded at the same time the vessel is shaped, and has a lip or spout, D, through which the contents of the vessel are poured.

In an article of this material subjected to constant use it has been found not advisable to form ears for the reception of the bail ends in the clay itself on account of the liability of such ears to be broken off and, as they cannot be replaced, unfit the vessel for further service. Therefore this rim C is formed, serving to retain a metallic band, to which the bail is attached from slipping over the top of the vessel. This metallic band E encircles the vessel, and is held against vertical displacement by hooks F attached to said band and constructed to clasp the rim of the vessel, said hooks having an eye or ring, a, through which the band passes, and which furnishes a convenient point of attachment for the bail, as shown in the drawings. The band E, simply passing through the eyes or rings, allows the hooks to be moved about and the position of the handle to be changed, if desired; or other rings may be attached to the band to afford engagement for the bail ends instead of attaching them to the hooks F.

Fire-burned clay, when heated, contracts unequally, and hence when a fire-clay vessel is brought in direct contact with a heated surface, and without provision for air-circulation thereunder, the vessel is liable to crack. The difficulty was partially overcome by forming a fire-clay vessel with feet or knobs, which, although they were apt to break off, sufficed when it was only desired to set the vessel on a heated surface, but would not stand the direct action of the flames. I have entirely removed this difficulty by providing not only means for air-circulation under the vessel, but which also allow me to place it in a position of direct contact with the flames. It consists in forming the vessel with a flat bottom and grooving and recessing said bottom to allow a free circulation between the vessel and hot surface upon which it rests.

In Fig. 3 I have shown the bottom of a fire-clay vessel concaved, as at $b$, and grooves $c\ c$ leading thereto. The particular configuration is of course immaterial as long as one is adopted which allows air-circulation.

Heretofore brass and iron vessels have been most commonly used, but they have been found heavy, difficult of cleaning, and expensive, and food cooked in brass kettles is oftentimes injurious to health. Porcelain-lined kettles have been offered as a substitute, but owing to the fact that iron and porcelain expand unequally the porcelain lining soon becomes fissured and retains much foreign matter, imparting a detrimental taste and color to articles cooked therein.

By my invention I have produced a substitute vessel of light weight, easily cleaned, lasting in use, and one which may be manufactured and supplied to the trade at a comparatively light cost.

I am aware that sheet-metal bake-pans have been constructed with corrugated bottoms and sides, and hence I make no claim to such an article.

Having fully described my invention, what I claim as new, and desire to secure by Letters Patent, is—

1. The combination, with a vessel formed with an outwardly-projecting flange or rim, of a metallic band encircling said vessel and a hook attached to the band and constructed to clasp the rim and hold the band against vertical displacement, substantially as set forth.

2. The combination, with a fire-clay cooking-vessel formed with an outwardly-projecting flange or rim, of a metallic band encircling said vessel and a hook attached to the band and constructed to clasp the rim and hold said band against vertical displacement, substantially as set forth.

3. The combination, with a vessel formed with an outwardly-projecting flange or rim, of a metallic band encircling said vessel and a hook attached to the band and constructed to clasp the rim and hold the band against displacement and to form a bail-ear for the bail, substantially as set forth.

4. The combination, with a fire-clay cooking-vessel formed with an outwardly-projecting flange or rim, of a metallic band encircling said vessel and a hook attached to the band and constructed to clasp the rim and hold the band against displacement and to form a bail-ear for the bail, substantially as set forth.

In testimony that I claim the foregoing I have hereunto set my hand.

HENRY C. WHITE.

Witnesses:
SIMEON E. LELAND,
HENRY CRAIG.